(12) United States Patent
Wen

(10) Patent No.: US 8,707,069 B2
(45) Date of Patent: Apr. 22, 2014

(54) SERVER

(75) Inventor: You-Xi Wen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 125 days.

(21) Appl. No.: 13/449,363

(22) Filed: Apr. 18, 2012

(65) Prior Publication Data
US 2013/0227308 A1 Aug. 29, 2013

(30) Foreign Application Priority Data
Feb. 29, 2012 (CN) .......................... 2012 1 0048698

(51) Int. Cl.
*G06F 1/26* (2006.01)
(52) U.S. Cl.
USPC .............................. 713/310; 307/326; 174/50
(58) Field of Classification Search
USPC .............................. 713/310; 307/326; 174/50
See application file for complete search history.

(56) References Cited

U.S. PATENT DOCUMENTS

| | | | | |
|---|---|---|---|---|
| 6,083,246 | A * | 7/2000 | Stendahl et al. | 607/5 |
| 7,761,022 | B2 * | 7/2010 | Seo | 399/88 |
| 7,825,757 | B2 * | 11/2010 | Tang et al. | 335/205 |
| 7,999,419 | B2 * | 8/2011 | Drane et al. | 307/326 |
| 2008/0199203 | A1 * | 8/2008 | Seo | 399/88 |

* cited by examiner

*Primary Examiner* — M Elamin
(74) *Attorney, Agent, or Firm* — Novak Druce Connolly Bove + Quigg LLP

(57) ABSTRACT

A server includes an enclosure, a motherboard, and first and second switches. The enclosure includes a base and a cover. The first switch is used to manually turn on or off the motherboard. The second switch is capable of turning off the motherboard and is mounted on a sidewall of the base. A stopping piece extends down from one side of the cover to abut against the second switch. The second switch is connected to a power-on pin of the motherboard. When the cover is not covering the base, the stopping piece fails to abut against the second switch. And the second switch is turned off. The power-on pin receives a power-off signal to power off the server.

2 Claims, 3 Drawing Sheets

SERVER

TECHNICAL FIELD

The present disclosure relates to a server.

DESCRIPTION OF RELATED ART

When a motherboard of a server need to be repaired, a side of the enclosure of the server is detached to gain access to the motherboard. However, if the user forgets to power off the server when repairing the motherboard, he/she may be electrocuted or may short-circuit circuitries on the motherboard. Therefore, there is room for improvement in the art.

BRIEF DESCRIPTION OF THE DRAWINGS

Many aspects of the present embodiments can be better understood with reference to the following drawings. The components in the drawing are not necessarily drawn to scale, the emphasis instead being placed upon clearly illustrating the principles of the present disclosure. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of example and not by way of limitation. It should be noted that references to "an" or "one" embodiment in this disclosure are not necessarily to the same embodiment, and such references mean at least one.

Figure 1:
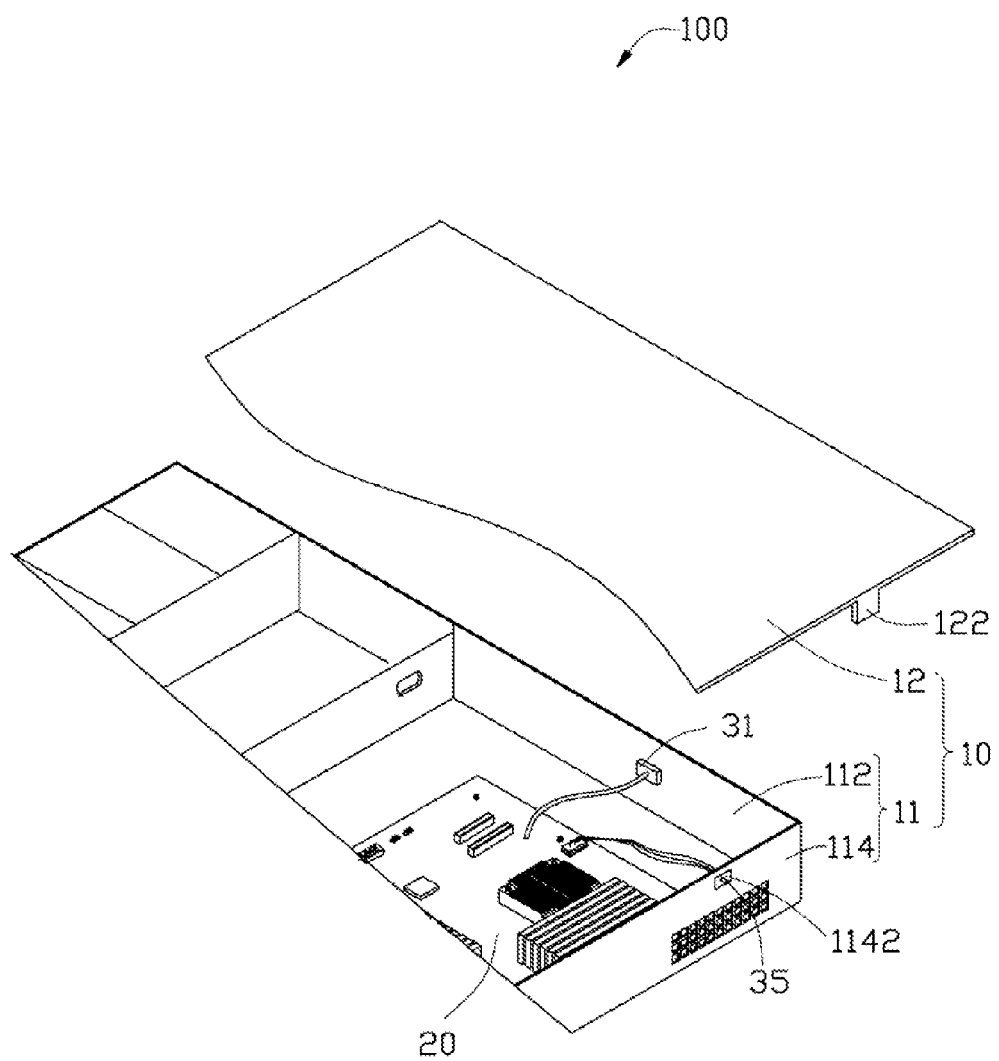
FIG. 1 is an exploded, isometric view of an exemplary embodiment of a server, wherein the server includes a motherboard, a first connector, a second connector, a switch, and a switch control circuit.
Figure 2:
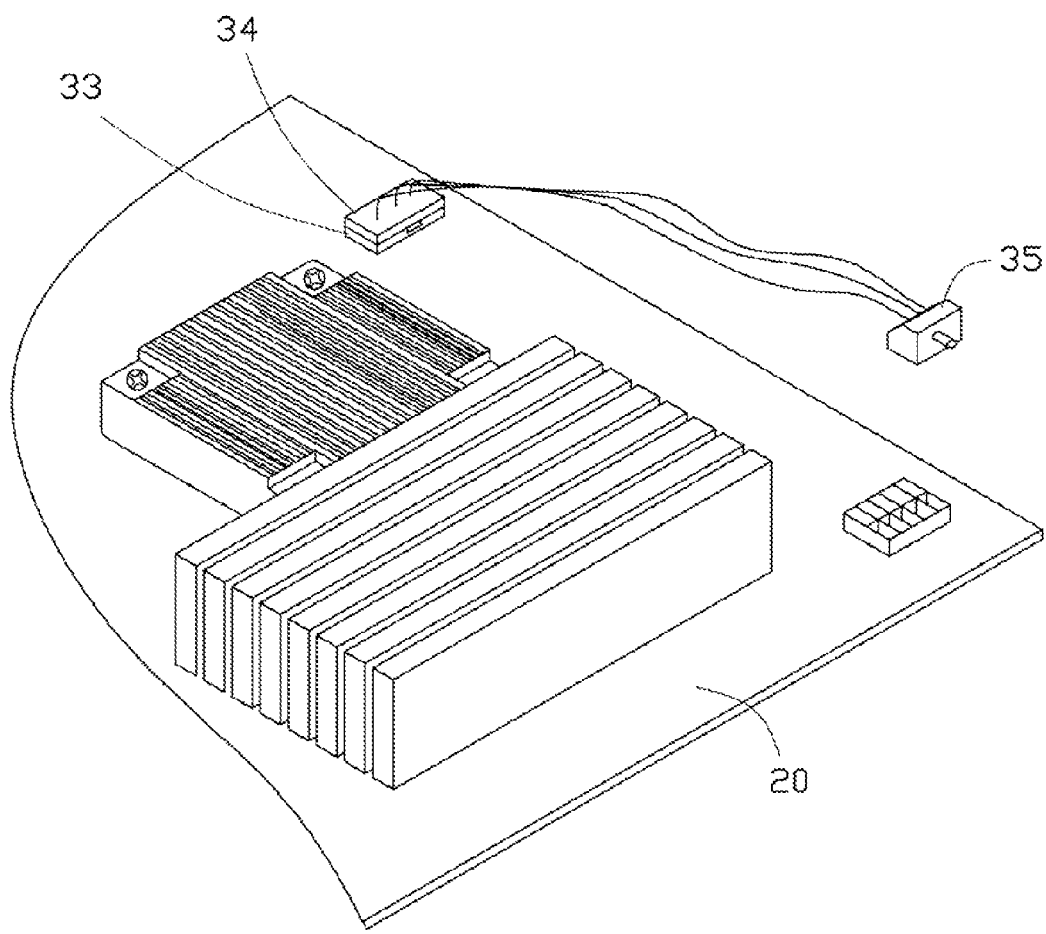
FIG. 2 is an isometric view of the motherboard connected to the first and second connectors, the switch, and the switch control circuit of FIG. 1.
Figure 3:
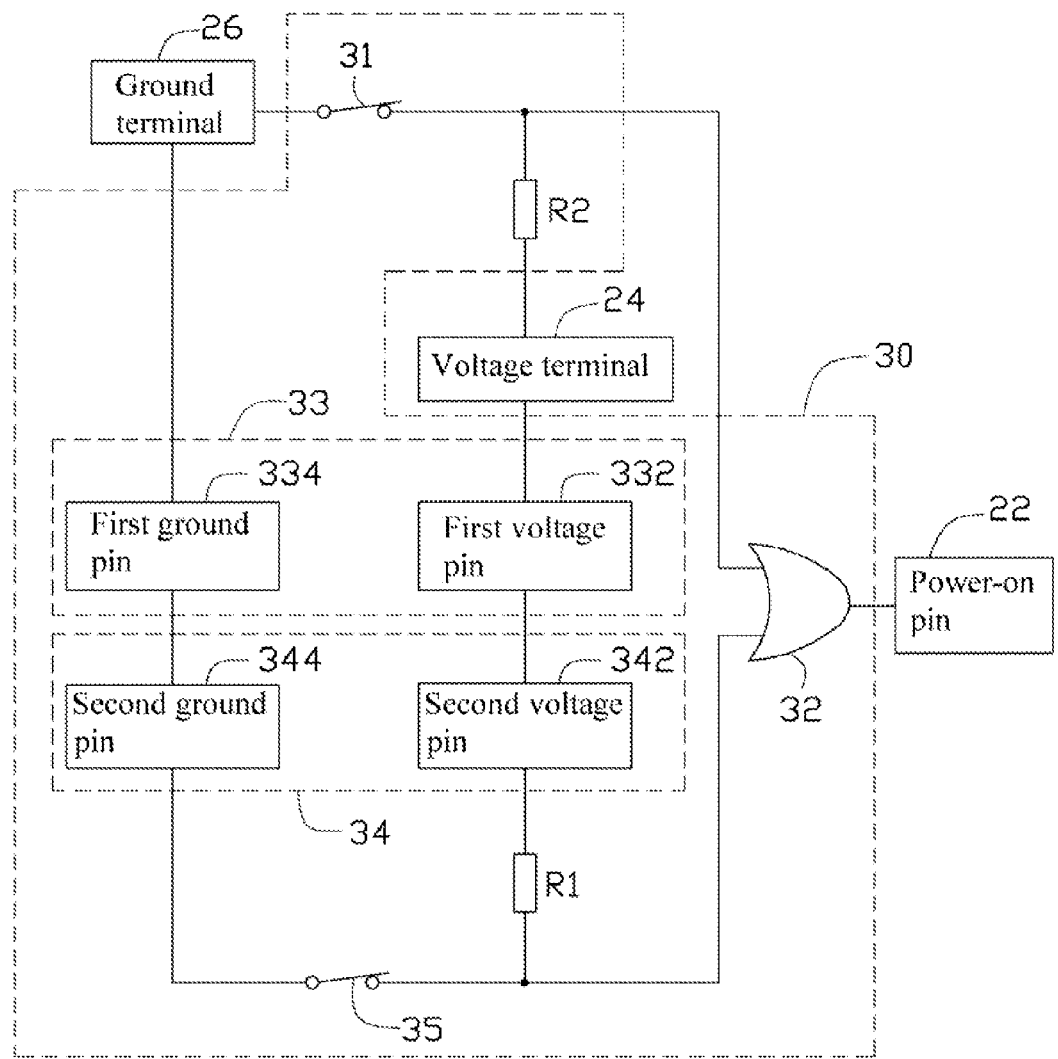
FIG. 3 is a circuit diagram of the switch control circuit of FIG. 1.

Referring to FIGS. 1 to 3, an embodiment of a server 100 includes an enclosure 10, a motherboard 20, and a switch control circuit 30.

The enclosure 10 includes a base 11 and a cover 12 covering on the base 11. The base 11 includes a sidewall 114. An opening 1142 is defined in the sidewall 114. A stopping piece 122 extends perpendicularly down from one side of the cover 12.

The motherboard 20 is received in the base 11. The motherboard 20 includes a power-on pin 22, a voltage terminal 24, and a ground terminal 26.

The switch control circuit 30 includes a first switch 31, an OR gate 32, a first connector 33, a second connector 34, and a second switch 35. The first switch 31 is mounted on and exposed through a front panel 112 of the base 11, to power on or power off the server 100. The OR gate 32 and the first connector 33 are mounted on the motherboard 20. The second switch 35 is mounted on the sidewall 114 of the base 11 and extends through the opening 1142. When the cover 12 is covered on the base 11, the stopping piece 122 abuts against the second switch 35.

The first connector 33 includes a first voltage pin 332 and a first ground pin 334. The first voltage pin 332 is connected to the voltage terminal 24 of the motherboard 20. The first ground pin 334 is connected to the ground pin 26 of the motherboard 20. The second connector 34 is detachably connected to the first connector 33. The second connector 34 includes a second voltage pin 342 and a second ground pin 344.

A first terminal of the second switch 35 is connected to the second voltage pin 342 of the second connector 34 through a resistor R1. The first terminal of the second switch 35 is further connected to a first input terminal of the OR gate 32. A second terminal of the second switch 35 is connected to the second ground pin 344 of the second connector 34.

A first terminal of the first switch 31 is connected to the voltage terminal 24 through a resistor R2. The first terminal of the first switch 31 is further connected to a second input terminal of the OR gate 32. A second terminal of the first switch 31 is connected to the ground terminal 26. An output terminal of the OR gate 32 is connected to the power-on pin 22.

In the embodiment, when the power-on pin 22 of the motherboard 20 receives a low level signal, such as logic 0, the server 100 is powered on. When the power-on pin 22 of the motherboard 20 receives a high level signal, such as logic 1, the server 100 is powered off.

When the second connector 34 is connected to the first connector 33, the first voltage pin 332 is connected to the second voltage pin 342. The first ground pin 334 is connected to the second ground pin 344. When the cover 12 is covering the base 11, the stopping piece 122 abuts against the second switch 35 on the sidewall 114 of the base 11. The second switch 35 is turned on. The first input terminal of the OR gate 32 is grounded through the second ground pin 344, the first ground pin 334, and the ground terminal 26. When the server 100 needs to be powered on, the first switch 31 is pressed to be turned on. The second input terminal of the OR gate 32 is grounded through the ground terminal 26. The output terminal of the OR gate 32 outputs a low level signal to the power-on pin 22 of the motherboard 20. The server 100 is powered on. When the server 100 does not need to be powered on, the first switch 31 is not pressed. The first switch 31 is turned off. The second input terminal of the OR gate 32 receives a high level signal from the voltage terminal 24. The output terminal of the OR gate 32 outputs the high level signal to the power-on pin 22 of the motherboard 20. The server 100 is powered off.

When the cover 12 is not covering the base 11, the stopping piece 122 fails to abut against the second switch 35. The second switch 35 is turned off. The first terminal of the OR gate 32 receives the high level signal from the second voltage pin 342, the first voltage pin 332, and the voltage terminal 24. At that time, whether the first switch 31 is turned on or off, the output terminal of the OR gate 32 outputs the high level signal to the power-on pin 22 of the motherboard 20. The server 100 is powered off. Therefore, when the cover 12 is not covering the base 11, the server 100 is powered off to avoid a hazardous situation.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A server, comprising:
    an enclosure comprising a base, and a cover detachably covering on the base, the base comprising a sidewall;

a motherboard received in the base, the motherboard comprising a power-on pin, a voltage terminal, and a ground terminal; and a switch control circuit comprising:
- a first switch comprising a first terminal connected to the ground terminal of the motherboard, and a second terminal connected to the voltage terminal through a first resistor;
- an OR gate comprising a first input terminal connected to the second terminal of the first switch, a second input terminal, and an output terminal connected to the power-on pin of the motherboard; and
- a second switch mounted on the sidewall of the base, the second switch comprising a first terminal connected to the ground terminal of the motherboard, and a second terminal connected to the voltage terminal of the motherboard through a second resistor and connected to the second input terminal of the OR gate;

wherein a stopping piece extends down from one side of the cover to abut against the second switch, wherein when the cover is not on the base, the stopping piece fails to abut against the second switch, the second switch is turned off, the output terminal of the OR gate outputs a power-off signal to the power-on pin of the motherboard to power off the server; wherein when the cover is on the base, the stopping piece abuts against the second switch to turn on the second switch, and when the first switch is turned on, the output terminal of the OR gate outputs a power-on signal to the power-on pin to power on the server.

2. The server of claim 1, wherein the switch control circuit further comprises a first connector, and a second connector connected to the first connector, the first connector comprises a first voltage pin and a first ground pin, the second connector comprises a second voltage pin and a second ground pin, the first terminal of the second switch is connected to the ground terminal of the motherboard through the second ground pin and the first ground pin, the second terminal of the second switch is connected to the voltage terminal of the motherboard through the second voltage pin and the first voltage pin.

* * * * *